Patented Jan. 19, 1954

2,666,774

UNITED STATES PATENT OFFICE 2,666,774

POLYHYDROXY-ETHER ADDITION COMPOUNDS WITH METAL SALTS

Alexander Grenall, Yorba Linda, Calif., assignor to Union Oil Company of California, Los Angeles, Calif., a corporation of California No Drawing. Application April 25, 1952, Serial No. 284,453

6 Claims. (Cl. 260—429)

This invention relates to certain novel compounds prepared by the addition of deliquescent metal salts to polyhydroxy ethers. The compounds may be prepared by simply admixing the two components in the desired combining ratio. The products formed are crystalline addition compounds which exhibit the interesting and unusual property of being stable and non-hygroscopic, even though both the metal salt and the polyhydroxy ether employed are themselves highly hygroscopic.

It is therefore an object of this invention to provide stable, non-hygroscopic addition compounds composed of components, one or more of which are themselves hygroscopic.

The unique properties of the addition compounds described herein render them useful for a variety of purposes. They may be conveniently employed as chemical intermediates in cases where the hydroxy ether compound is to be condensed with another reactant to produce for example esters or ethers with the elimination of water. In cases such as these, the deliquescent metal salt will act as a dehydrating agent, thereby assisting the reaction. They may also be employed wherever it is desirable to utilize, handle or transport one of the deliquescent components in a hydrous environment without the component itself becoming hydrated. Inasmuch as both components are known to lower the freezing point of water, the compounds may be conveniently utilized for the preparation of refrigerant brines. Other uses will be obvious to those skilled in the various chemical arts.

A considerable number of the addition compounds of polyhydroxy compounds and metal salts have been previously described. However, those which are prepared from hygroscopic components are described as also being hygroscopic in themselves. A prime example of such a hygroscopic compound is that formed between glycerol and calcium chloride. (Grun et al., Ber. 43, 1295). In the present case, the polyhydroxy ethers, especially the symmetrical polyhydroxy ethers, are found to give non-hygroscopic addition compounds.

The polyhydroxy ethers which may be employed include primarily the polyalkylene glycols such as diethylene glycol, triethylene glycol, 1,2-dipropylene glycol, 1,2-tripropylene glycol, 1,3-dipropylene glycol, 1,3-tripropylene glycol.

The metal salts which may be combined with the polyhydroxy ethers include primarily the deliquescent salts of metals belonging to Groups II-A and II-B of the Periodic Table. Examples of such salts include calcium chloride, magnesium chloride, zinc chloride, zinc sulfate.

The preferred method for forming the addition compounds consists simply in admixing the salt with the polyhydroxy ether at ordinary atmospheric temperatures. If the proper combining ratios are employed, the liquid slurry formed upon initial admixture will solidify into a sensibly dry and hard solid which may be purified by recrystallization from water, alcohol or other suitable solvent. X-ray analysis of the addition compounds shows a definite crystal structure differing from that of either component. In general it is found that about 2 molar proportions of polyhydroxy ether will combine with one mole of the metal salt. Smaller proportions of the ether result in more rapid "setting" of the slurry, and a harder mass; larger proportions result in viscous solutions.

EXAMPLE I

Approximately 100 grams of anhydrous calcium chloride was added with stirring to about 190 grams of diethylene glycol at room temperature in a beaker. After a few minutes, a solid white mass formed which showed a tendency to adhere to the walls of the beaker. This material was found to be sensibly dry, and remained so after exposure to air for several days, in contrast to a sample of calcium chloride which absorbed sufficient atmospheric moisture to become liquid after a short time. X-ray analysis of the material showed a definite crystal structure. The material began to melt at 240° F., and boiled at 300° F. with decomposition. Analysis showed it to consist of approximately one mole of calcium chloride and two moles of diethylene glycol. It was soluble in water and alcohol, and insoluble in benzene, toluene, and n-heptane.

The procedure of the above example may be employed for preparing substantially any desired addition compound by merely substituting the proper salt and polyhydroxy ether for the calcium chloride and diethylene glycol. The compounds may also be prepared by other methods, as by mixing in the presence of a mutual solvent such as water which may then be partially evaporated to give a mother liquid and a crystalline precipitate. Or, if desired, one component may be dissolved in a solvent in which the other component is insoluble, and the insoluble component then added to the solution as a precipitant. Various other methods will be obvious to those skilled in the art.

The foregoing disclosure of this invention is not to be considered as limiting since many variations may be made by those skilled in the art without departing from the scope or spirit of the following claims:

I claim:

1. A solid, non-hygroscopic addition compound of diethylene glycol and a hygroscopic salt of a metal selected from Groups II-A and II-B of the Periodic Table.

2. A solid, non-hygroscopic addition compound of diethylene glycol and calcium chloride.

3. A solid, non-hygroscopic addition compound of diethylene glycol and magnesium chloride.

4. A solid, non-hygroscopic addition compound of diethylene glycol and zinc chloride.

5. A solid, non-hygroscopic addition compound of (1) a lower polymer of a lower alkylene glycol and (2) a hygroscopic salt of a metal selected from Groups II-A and II-B of the Periodic Table.

6. A compound as defined in claim 8 wherein said polymer of said alkylene glycol is selected from the group consisting of dimers and trimers of ethylene glycol and propylene glycols.

ALEXANDER GRENALL.

References Cited in the file of this patent

Gomer et al.; J. Am. Chem. Soc., vol. 66 (1944), pp. 1331–1333.

C. A. vol. 29, pp. 2507–08 (1935).

Shukis et al.; J. Am. Chem. Soc., vol. 65, pp. 2365–66, Dec. 1943.